United States Patent
Butcher et al.

(10) Patent No.: US 10,528,283 B2
(45) Date of Patent: Jan. 7, 2020

(54) SYSTEM AND METHOD TO PROVIDE PERSISTENT STORAGE CLASS MEMORY USING NVDIMM-N WITH AN NVDIMM-P FOOTPRINT

(71) Applicant: DELL PRODUCTS, LP, Round Rock, TX (US)

(72) Inventors: Andrew Butcher, Cedar Park, TX (US); Vadhiraj Sankaranarayanan, Austin, TX (US); Syama S. Poluri, Round Rock, TX (US); Krishna P. Kakarla, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 69 days.

(21) Appl. No.: 15/877,639

(22) Filed: Jan. 23, 2018

(65) Prior Publication Data

US 2019/0227709 A1 Jul. 25, 2019

(51) Int. Cl.
*G06F 3/06* (2006.01)
*G06F 12/02* (2006.01)

(52) U.S. Cl.
CPC .............. *G06F 3/065* (2013.01); *G06F 3/064* (2013.01); *G06F 3/0604* (2013.01); *G06F 3/068* (2013.01); *G06F 12/0246* (2013.01)

(58) Field of Classification Search
CPC ........ G06F 3/065; G06F 3/0604; G06F 3/068; G06F 3/064
See application file for complete search history.

(56) References Cited

U.S. PATENT DOCUMENTS

| | | | |
|---|---|---|---|
| 9,721,660 B2 | 8/2017 | Kelly et al. | |
| 2016/0118121 A1 | 4/2016 | Kelly et al. | |
| 2016/0203085 A1* | 7/2016 | Kranich | G06F 12/0802 713/2 |
| 2016/0342487 A1* | 11/2016 | Ware | G11C 7/20 |
| 2016/0378344 A1 | 12/2016 | Ware et al. | |
| 2017/0206165 A1 | 7/2017 | Nachimuthu et al. | |
| 2018/0059958 A1* | 3/2018 | Ryan | G11C 11/404 |

OTHER PUBLICATIONS

"Netlist Demonstrates the First Storage Class Memory Running Real-World Applications with HybriDIMM," Flash Memory Summit, 2017, Santa Clara, California, FMS2017 Demonstration Description; 1 pg.; http://s2.g4cdn.com/000096926/files/doc_downloads/hybridimm/Netlist-FMS2017-Demonstration-Brief-v3.1-FINAL.PDF.

* cited by examiner

*Primary Examiner* — Tasnima Matin
(74) *Attorney, Agent, or Firm* — Larson Newman, LLP (57) ABSTRACT

A non-volatile dual in-line memory module (NVDIMM) includes a dynamic random access memory (DRAM) block, a plurality of non-volatile random access memory (NVRAM) blocks, and an NVDIMM controller. The DRAM block is organized into a number (N) of pages. Each NVRAM block is organized into the number (N) of pages, each page of the DRAM block being N-way set associatively associated with a page of each of the NVRAM blocks. The NVDIMM controller is configured to copy first data from a first page of a first NVRAM block to an associated first page of the DRAM block.

15 Claims, 5 Drawing Sheets

SYSTEM AND METHOD TO PROVIDE PERSISTENT STORAGE CLASS MEMORY USING NVDIMM-N WITH AN NVDIMM-P FOOTPRINT

FIELD OF THE DISCLOSURE

This disclosure generally relates to information handling systems, and more particularly relates to providing persistent storage class memory using NVDIMM-N with an NVDIMM-P footprint.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A non-volatile dual in-line memory module (NVDIMM) may include a dynamic random access memory (DRAM) block, a plurality of non-volatile random access memory (NVRAM) blocks, and an NVDIMM controller. The DRAM block may be organized into a number (N) of pages. Each NVRAM block may be organized into the number (N) of pages, each page of the DRAM block being N-way set associatively associated with a page of each of the NVRAM blocks. The NVDIMM controller may be configured to copy first data from a first page of a first NVRAM block to an associated first page of the DRAM block.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
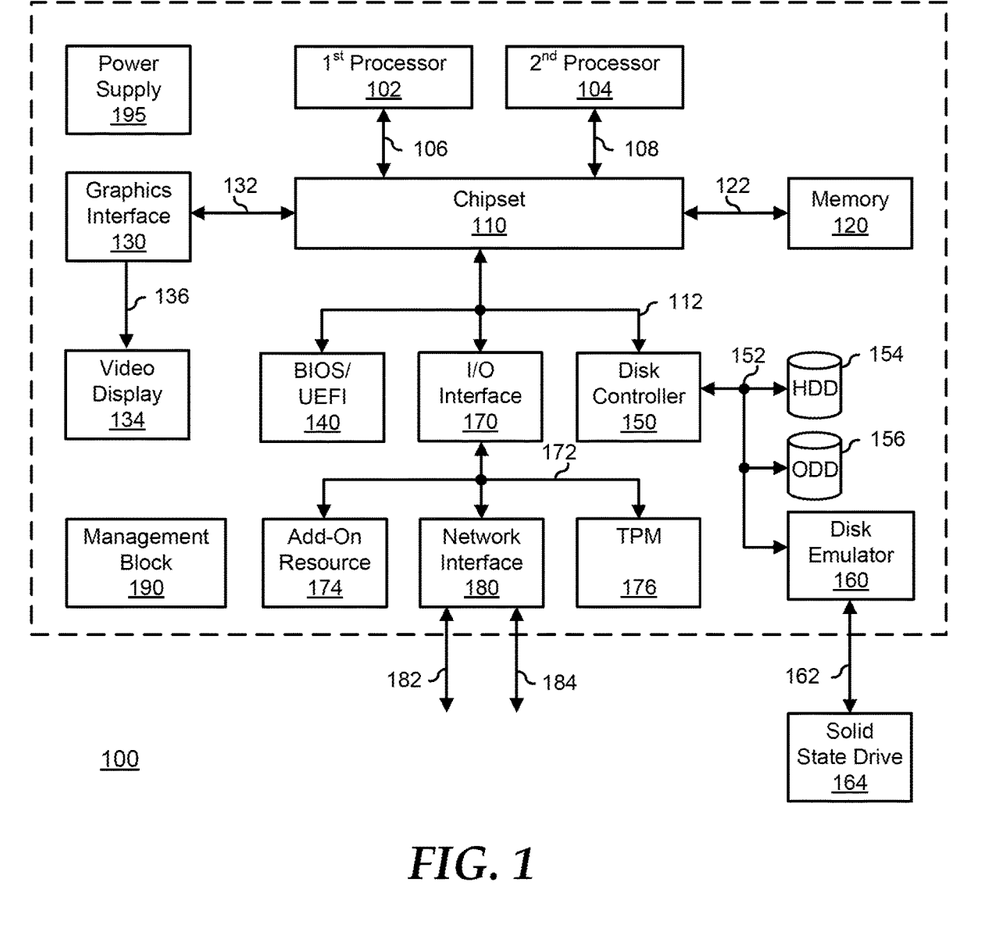
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/universal extensible firmware interface (BIOS/UEFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/UEFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 140 includes BIOS/UEFI code operable to detect resources within information handling system 100, to provide drivers for the resources, initialize the resources, and access the resources. BIOS/UEFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
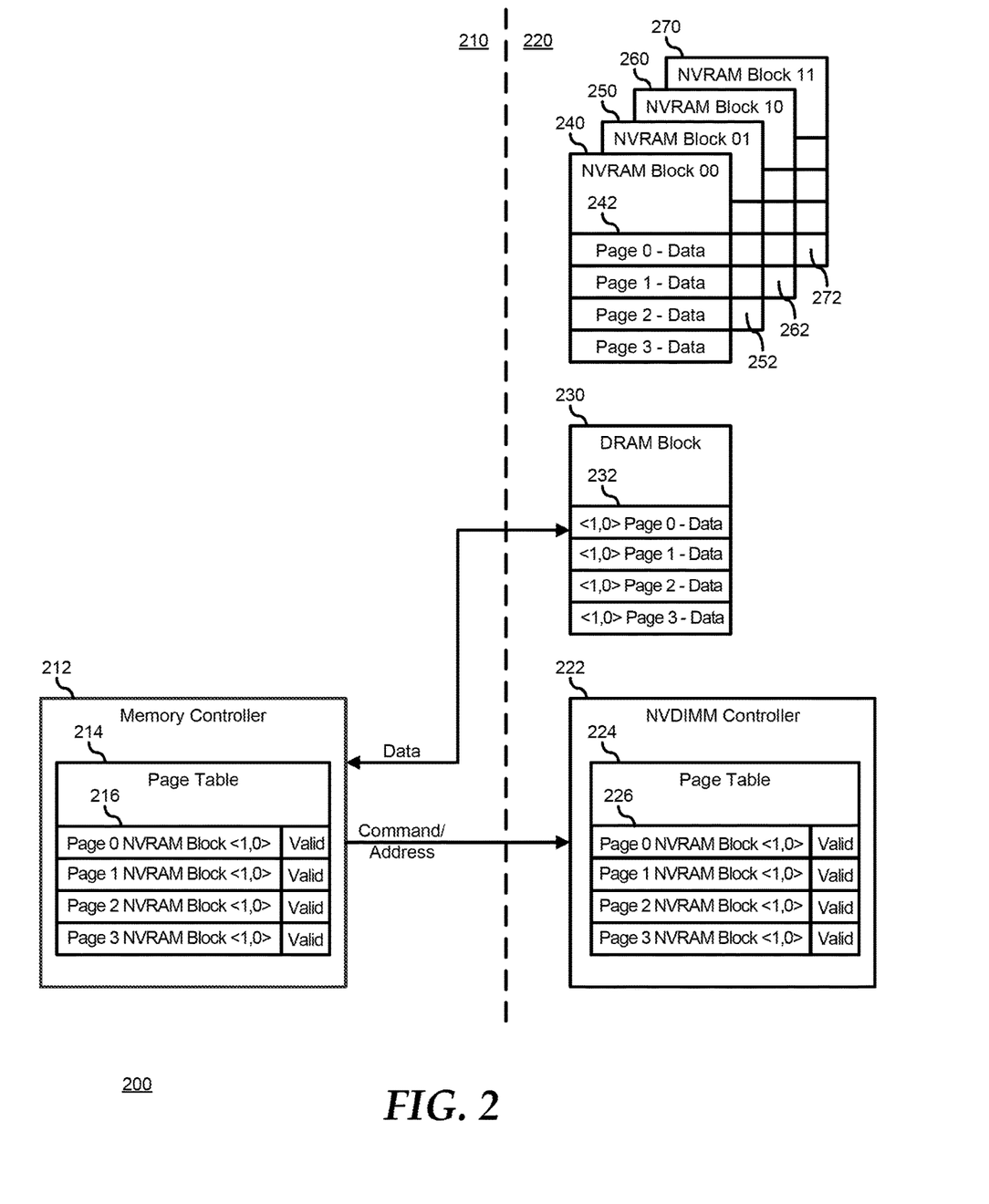
FIG. 2 is a block diagram illustrating an information handling system including a memory controller and an NVDIMM according to an embodiment of the present disclosure.

FIG. 2 illustrates an information handling system 200 similar to information handling system 100, including a processor complex 210 and a non-volatile dual in-line memory module (NVDIMM) 220. Processor complex 210 operates to provide data processing functionality of information handling system 200, such as is typically associated with an information handling system. As such, processor complex 210 represents a data processing apparatus, such as one or more central processing units (CPUs) or processor cores, and the associated data input and output I/O functionality, such as a chipset component, and other I/O processor components. Processor complex 210 operates to execute machine-executable code to perform the data processing tasks associated with information handling system 200.

Memory controller 212 represents a portion of the processor complex that is dedicated to the management of the data storage and retrieval from the memory devices of information handling system 200, and information handling system 200 may include one or more additional memory controllers similar to memory controller 212, as needed or desired. Memory controller 212 may reside on a system printed circuit board, may be integrated into an I/O processor component, may be integrated with a processor on a system-on-a-chip (SoC), or may be implemented in another way, as needed or desired. Memory controller 212 operates to provide data and control interfaces to one or more DIMM, such as NVDIMM 220 in accordance with a particular memory architecture. For example, memory controller 212 and NVDIMM 220 may operate in accordance with a Double-Data Rate (DDR) standard, such as a JEDEC DDR4 or DDR5 standard.

NVDIMM 220 represents a memory device of information handling system 200 that is packaged as a DIMM in accordance with the particular memory architecture by which memory controller 212 operates. NVDIMM 220 includes an NVDIMM controller 222, a dynamic random access memory (DRAM) block 230, and non-volatile random access memory (NVRAM) blocks 240, 250, 260, and 270. DRAM block 230 represents one or more DRAM devices and NVRAM blocks 240, 250, 260, and 270 each represent one or more NVRAM devices.

It will be understood by the skilled artisan, that NVRAM blocks 240, 250, 260, and 270 may provide a large data storage capacity, as compared to DRAM block 230, but with a substantially longer data access latency. On the other hand, it will be understood that DRAM block 230 may provide a smaller data storage capacity, but with a much shorter data access latency. Further, the skilled artisan will understand that DRAM block 230 may provide byte-addressable data access, while NVRAM blocks 240, 250, 260, and 270 may typically be block-addressable. For example, a typical DRAM DIMM may provide a data storage capacity of 32 gigabytes (GB), 64 GB, 128 GB, or more, with access latencies around 10+ nanoseconds (ns), while a typical NVDIMM-P may provide a data storage capacity of 100 GB to 1 terabyte (TB), with access latencies around 100+ ns. As described further below, NVDIMM 220 operates to provide a large data storage capacity, as determined by the combined data storage capacities of NVRAM blocks 240, 250, 260, and 270, but with byte-addressability and low data access latency as provided by DRAM block 230.

Memory controller 212 operates to byte-addressably map the entire memory space of the combined data storage capacities of NVRAM blocks 240, 250, 260, and 270, such that memory transactions targeted to any byte location of the NVRAM blocks can be accessed by paging the information from the NVRAM blocks into DRAM block 230, and then accessing the data from the byte location directly from the DRAM block. As such, DRAM block 230 is organized into pages 232. For example, where DRAM block 230 represents a 32 GB DRAM memory, the DRAM block can be organized into four pages of 8 GB each, into eight pages of 4 GB each, into 16 pages of 2 GB each, or into another number of pages, as needed or desired. Similarly, NVRAM blocks 240, 250, 260, and 270 are each organized into respective pages 242, 252, 262, and 272, where the NVRAM blocks each include the same number of pages as DRAM block 230.

In operation, pages 232 are n-way set associatively mapped to pages 242, 252, 262, and 272 such that selected pages from NVRAM blocks 240, 250, 260, and 270 are copied into associated pages 232. For example, where each of DRAM block 230 and NVRAM blocks 240, 250, 260, and 270 include four pages, then the first page (page 0) of any one of pages 242, 252, 262, and 272 can be stored at the first page (page 0) of pages 232, the second page (page 1) of any one of pages 242, 252, 262, and 272 can be stored at the second page (page 1) of pages 232, and etc. Then, when memory controller 212 makes a memory access to a byte address within a page that is copied into one of pages 232, the memory transaction is serviced by DRAM block 230 directly. On the other hand, when memory controller 212 makes a memory access to a byte address within a page that is not copied into one of pages 232, then the memory controller directs NVDIMM controller 222 to evict the particular copied page of pages 232 back to the source page of pages 242, 252, 262, or 272, and to copy the addressed page of pages 242, 252, 262, or 272 into the associated page of pages 232, before servicing the memory access directly from DRAM block 230.

To manage the operations of NVDIMM 220, memory controller 212 includes a page table 214 that maintains information as to the current state of DRAM block 230. As such, page table 214 includes a number of page table entries 216 that is equal to the number of pages 232, 242, 252, 262, and 272. Here, where each of DRAM block 230 and NVRAM blocks 240, 250, 260, and 270 include four pages, a first page table entry (page 0) is associated with the first page table entries (page 0) of the DRAM block and the NVRAM blocks, a second page table entry (page 1) is associated with the second page table entries (page 1) of the DRAM block and the NVRAM blocks, and etc. Thus each page table entry 216 is associated with a page, and includes an identifier of the NVRAM block 240, 250, 260, and 270 that is currently copied into the associated page 232 of DRAM block 230. Each page table entry 216 includes a valid bit to identify whether or not the currently mapped entry of the page table entries is valid, that is, that the page table entry correctly identifies which page 242, 252, 262, or 272 is currently copied to page 232.

Thus, when processor complex 210 issues a memory transaction, memory controller 212 first checks page table 214 to determine if the byte address of the memory transaction is associated with a page 242, 252, 262, or 272, that is currently copied into DRAM block 230. Here, memory controller 212 first determines that the byte address is within the memory range one of NVRAM blocks 240, 250, 260, and 270, and is within a particular page (page 0, page 1, page 2, or page 3) of pages 242, 252, 262, or 272 of that NVRAM block. Then, having identified the NVRAM block 240, 250, 260, or 270 and the particular page (page 0, page 1, page 2, or page 3), memory controller 212 checks the associated page table entry (entry 0, entry 1, entry 2, or entry 3) of page table entries 216 to determine if the identified NVRAM block is indicated as being copied to the associated page (page 0, page 1, page 2, or page 3) of pages 232, and if the indication is valid.

If the check indicates that the memory transaction is to a page that is copied to DRAM block 230, then memory controller 212 issues the transaction on the command/address bus to NVDIMM controller 222, and performs the memory transaction on the data bus with the DRAM block. However, if the check indicates that the memory transaction is not to a page that is copied to DRAM block 230, then memory controller 212 sends a swap page command to NVDIMM controller 222 on the command/address bus directing the NVDIMM controller to evict the particular copied page of pages 232 back to the source page of pages 242, 252, 262, or 272, and to copy the addressed page of pages 242, 252, 262, or 272 into the associated page of pages 232.

In a particular embodiment, when the memory transaction is not to a page that is copied to DRAM block 230, memory controller 212 also places the memory transaction into a hold until NVDIMM controller 222 provides an indication that the swap page command has been executed. Then memory controller 212 issues the memory transaction on the command/address bus to NVDIMM controller 222, and performs the memory transaction on the data bus with DRAM block 230. An example of the indication can include a dedicated signal line between memory controller 212 and NVDIMM controller 222, an assertion by the NVDIMM controller of an ALERT_N signal which prompts the memory controller to perform a service routine to discover that the swap is complete, or another indication. Where the indication is via the assertion of the ALERT_N signal, NVDIMM controller 222 can store status information related to the swap page command in register space of the NVDIMM controller to identify the type of indication.

In another embodiment, the swap page command also includes the memory transaction. Here, when NVDIMM controller 222 has executed the swap page command, then the memory transaction is also performed on the data bus with DRAM block 230, without having to receive a separate memory transaction from memory controller 212. Here, the duration of time for memory controller 222 to evict the particular copied page of pages 232 back to the source page of pages 242, 252, 262, or 272, and to copy the addressed page of pages 242, 252, 262, or 272 into the associated page of pages 232 can be a fixed duration. As such, memory controller 212 is configured to expect the reply to the memory transaction after the fixed duration. In a particular case, NVDIMM controller 222 can include the duration in the Serial Presence Detect (SPD) information that is discovered by memory controller 212 during memory initialization.

NVDIMM controller 222 is illustrated as including a page table 224 similar to page table 214, and including page table entries 226 similar to page table entries 216. Here, NVDIMM controller 222 will maintain page table 224 to mirror the contents of page table 214, and when memory controller 212 issues a swap page command, the NVDIMM controller will also update page table entries 226 to maintain consistency between the page tables.

It will be understood that DRAM block 230 consist of one or more DRAM devices. Moreover, where DRAM block 230 consists of more than one DRAM device, pages 232 may span across more than one DRAM device, or man by defined wholly within a single DRAM device, as needed or desired. Further, it will be understood that NVRAM blocks 240, 250, 260, and 270 may consist of a single NVRAM device or may consist of more than one device. For example, where NVRAM blocks 240, 250, 260, and 270 consist of a single NVRAM device, the NVRAM device may be organized such that different memory portions of the NVRAM device are organized into the various NVRAM blocks, and in general, a single NVRAM device may be organized as all or parts of multiple NVRAM blocks. In another example, where NVRAM blocks 240, 250, 260, and 270 consist of four NVRAM devices, each NVRAM device may be associated with a single NVRAM block, or the NVRAM blocks may each span across multiple NVRAM devices.

Figure 3:
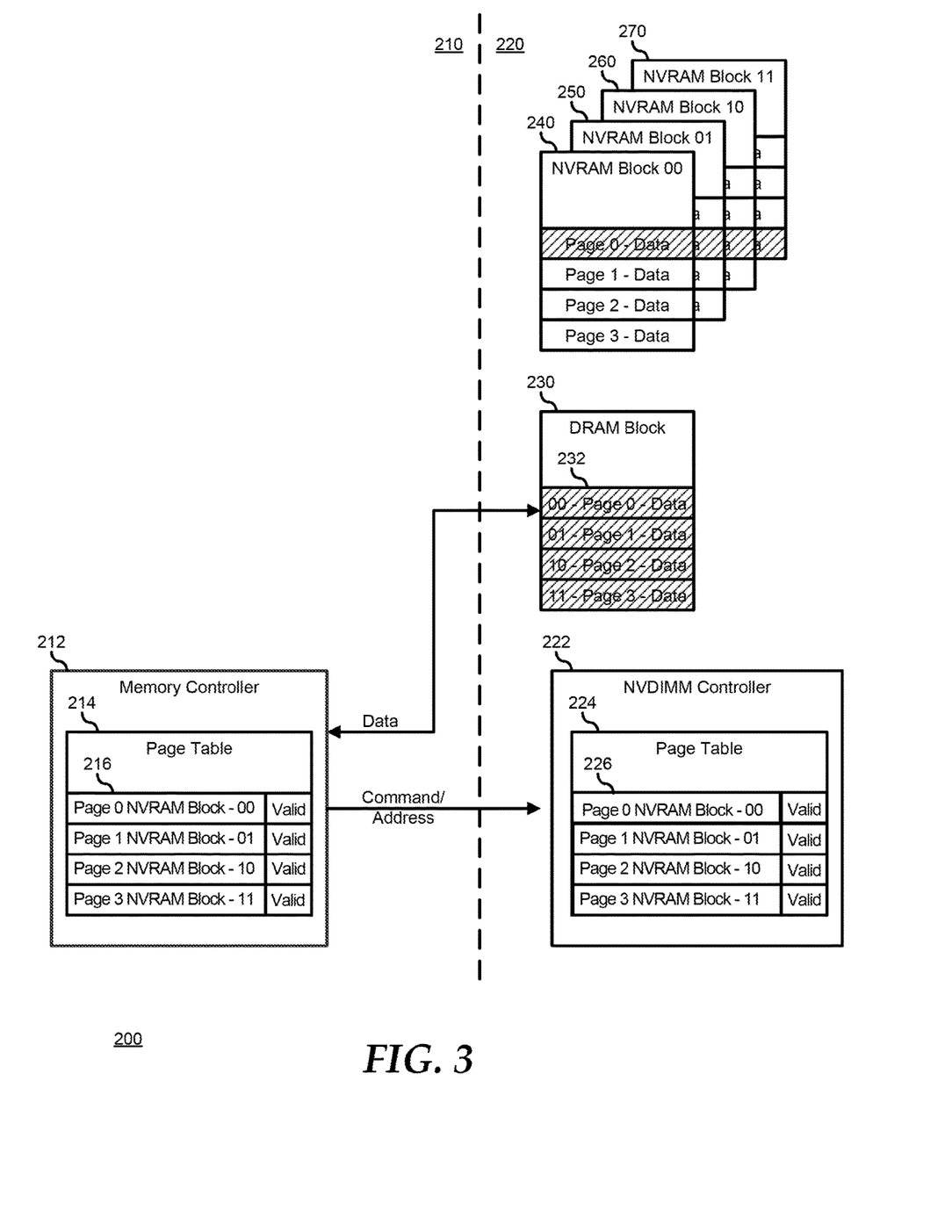
FIG. 3 illustrates the information handling system of FIG. 2 with an exemplary data storage configuration.

FIG. 3 illustrates information handling system 200 with an exemplary data storage configuration in NVDIMM 220. Here, the first page (page 0) of pages 232 stores a copy of the first page (page 0) of NVRAM block 240 (block 00), the second page (page 1) of pages 232 stores a copy of the second page (page 1) of NVRAM block 250 (block 01), the third page (page 2) of pages 232 stores a copy of the third page (page 2) of NVRAM block 260 (block 10), and the fourth page (page 3) of pages 232 stores a copy of the fourth page (page 3) of NVRAM block 270 (block 11). Reflecting this data storage configuration, the first page table entry (entry 0) of page table 214 shows that the first page (page 0) of pages 232 stores the first page (page 0) of NVRAM block 240 (block 00) and is valid, the second page table entry (entry 1) shows that the second page (page 1) of pages 232 stores the second page (page 1) of NVRAM block 250 (block 01) and is valid, the third page table entry (entry 2) shows that the third page (page 2) of pages 232 stores the third page (page 2) of NVRAM block 260 (block 10) and is valid, and the fourth page table entry (entry 3) shows that the fourth page (page 3) of pages 232 stores the fourth page (page 3) of NVRAM block 270 (block 11) and is valid. Finally, page table 224 reflects the information of page table 214.

Figure 4:
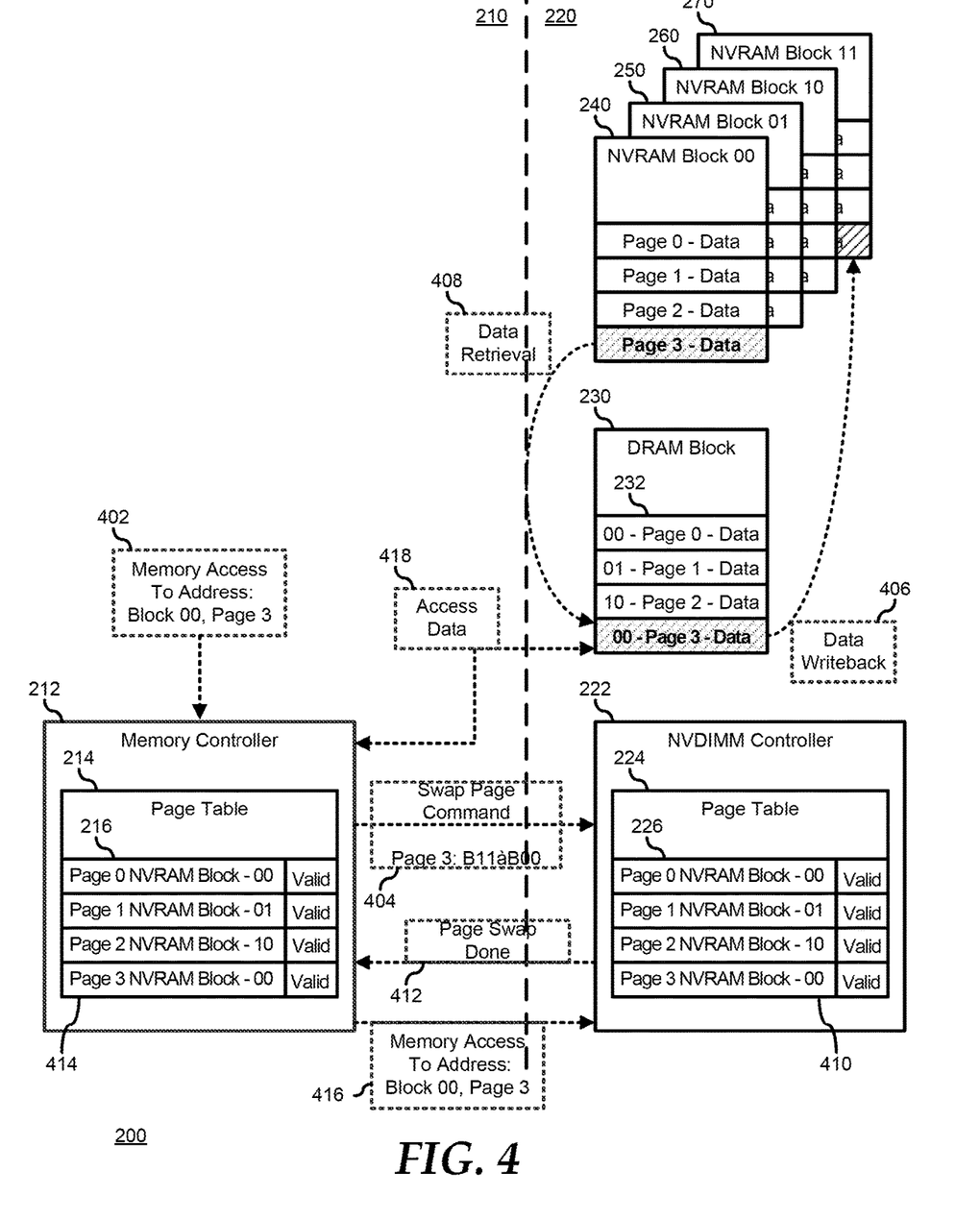
FIG. 4 illustrates a method of accessing data stored in the NVDIMM of FIG. 2, according to an embodiment of the present disclosure.

FIG. 4 illustrates a method of accessing data stored in an NVRAM block 240, 250, or 260 that is not resident in DRAM block 230. FIG. 4 assumes an initial condition as found in FIG. 3, above. A memory transaction is received from processor complex 210 by memory controller 212 in step 402. Memory transaction 402 is for a byte address in page 3 of block 00. Memory controller 212 checks whether or not page 3 of block 00 is copied to page 3 of DRAM block 230 in entry 3 of page table 214. Memory controller 212 discovers that entry 3 of page table 214 indicates that page 3 of NVRAM block 270 (block 11) is copied to page 3 of DRAM block 230. In response, memory controller 212 holds the memory transaction from step 402 and issues a swap page command to NVDIMM controller 222, directing the NVDIMM controller to swap page 3 in DRAM block 230, that is, the page 3 data of NVRAM block 270 (block 11), with the page 3 data of NVRAM block 240 (block 00) in step 404.

In response to receiving the swap page command in step 404, NVDIMM controller 222 directs a write-back of the page 3 data from DRAM block 230 to page 3 of NVRAM 270 (block 11) in step 406, and directs a data retrieval of the page 3 data from NVRAM 240 (block 00) to page 3 of DRAM block 230 in step 408. NVDIMM controller 222 then updates entry 3 of page table 226 to reflect that page 3 of DRAM block 230 now stores a copy of the page 3 data of NBRAM block 240 in step 410, and sends a response to memory controller 212 that the page swap command has been executed in step 412. Memory controller 212 then updates entry 3 of page table 212 to indicate that page 3 of DRAM block 230 now stores a copy of the page 3 data of NBRAM block 240 in step 414. Finally, memory controller 212 issues the memory transaction to page 3 of block 00 to NVDIMM controller 222 in block 416, and performs the memory transaction with page 3 of DRAM block 230 in step 418.

Figure 5:
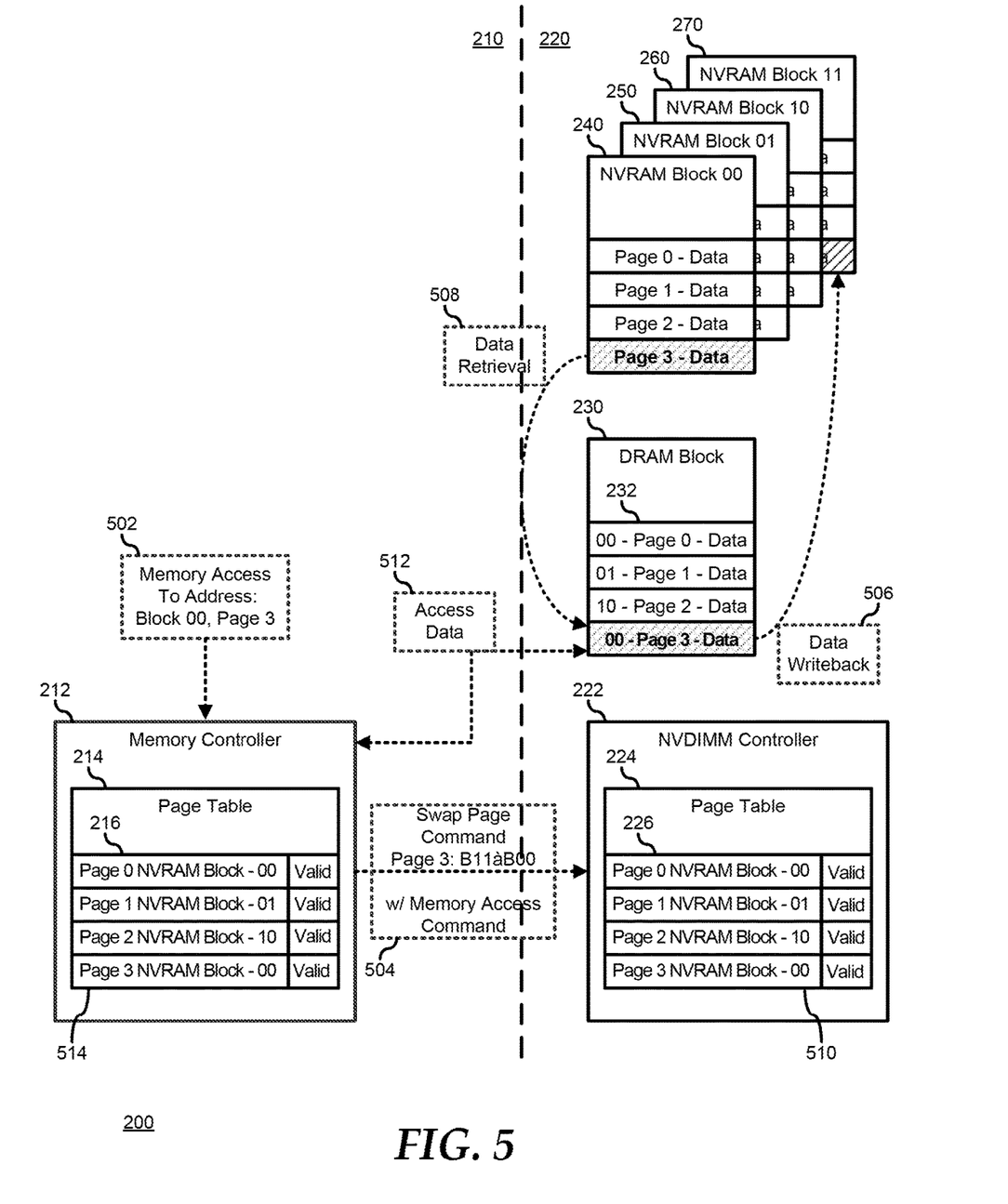
FIG. 5 illustrates a method of accessing data stored in the NVDIMM of FIG. 2, according to another embodiment of the present disclosure.

FIG. 5 illustrates another method of accessing data stored in an NVRAM block 240, 250, or 260 that is not resident in DRAM block 230. FIG. 5 assumes an initial condition as found in FIG. 3, above. A memory transaction is received from processor complex 210 by memory controller 212 in step 502. Memory transaction 502 is for a byte address in page 3 of block 00. Memory controller 212 checks whether or not page 3 of block 00 is copied to page 3 of DRAM block 230 in entry 3 of page table 214. Memory controller 212 discovers that entry 3 of page table 214 indicates that page 3 of NVRAM block 270 (block 11) is copied to page 3 of DRAM block 230. In response, memory controller 212 issues a swap page command to NVDIMM controller 222, directing the NVDIMM controller to swap page 3 in DRAM block 230, that is, the page 3 data of NVRAM block 270 (block 11), with the page 3 data of NVRAM block 240 (block 00) in step 504. The swap page command in step 504 also includes the memory transaction from step 502.

In response to receiving the swap page command/memory transaction in step 504, NVDIMM controller 222 holds the memory transaction, directs a write-back of the page 3 data from DRAM block 230 to page 3 of NVRAM 270 (block 11) in step 506, and directs a data retrieval of the page 3 data from NVRAM 240 (block 00) to page 3 of DRAM block 230 in step 508. NVDIMM controller 222 then updates entry 3 of page table 226 to reflect that page 3 of DRAM block 230 now stores a copy of the page 3 data of NBRAM block 240 in step 510, and executes the memory transaction with page 3 of DRAM block 230 in step 512. Memory controller 212 then updates entry 3 of page table 212 to indicate that page 3 of DRAM block 230 now stores a copy of the page 3 data of NBRAM block 240 in step 514.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-volatile dual in-line memory module (NVDIMM), comprising:
    a dynamic random access memory (DRAM) block, the DRAM block organized into a number (N) of pages;
    a plurality of non-volatile random access memory (NVRAM) blocks, each NVRAM block organized into the number (N) of pages, each page of the DRAM block being N-way set associatively associated with a page of each of the NVRAM blocks; and
    an NVDIMM controller configured to:
        receive a page swap command from a memory controller of an information handling system, the page swap command identifying a first page of a first NVRAM block copied to an associated first page of the DRAM block and identifying a second page of a second NVRAM block;
        copy first data from the first page of the DRAM block to the first page of the first NVRAM block in response to receiving the page swap command; and
        copy second data from the second page of the second NVRAM block to the first page of the DRAM block in further response to receiving the page swap command.

2. The NVDIMM of claim 1, the NVDIMM configured to receive a memory transaction targeted to an address within the second page of the second NVRAM block; and
    respond to the first memory transaction from the first page of the DRAM block.

3. The NVDIMM of claim 2, wherein the NVDIMM controller is further configured to send a reply to the memory controller that the swap page command has been executed in response to copying the first data from the first page of the first NVRAM block to the first page of the DRAM block.

4. The NVDIMM of claim 2, wherein the memory transaction is received after the page swap command.

5. The NVDIMM of claim 2, wherein the memory transaction is included in the page swap command.

6. The NVDIMM of claim 2, wherein the NVDIMM controller is further configured to send an interrupt to the memory controller that the swap page command has been executed in response to copying the first data from the first page of the first NVRAM block to the first page of the DRAM block.

7. A method, comprising:
    organizing a dynamic random access memory (DRAM) block of a non-volatile dual in-line memory module (NVDIMM) into a number (N) of pages;
    organizing each non-volatile random access memory (NVRAM) block of a plurality of NVRAM blocks of the NVDIMM into the number (N) of pages, each page of the DRAM block being N-way set associatively associated with a page of each of the NVRAM blocks;

receiving, by the NVDIMM controller, a page swap command from the memory controller, the page swap command identifying a first page of a first NVRAM block copied to an associated first page of the DRAM block and identifying a second page of a second first NVRAM block; and copying, by the NVDIMM controller, first data from the first page of the DRAM block to the first page of the first NVRAM block in response to receiving the page swap command, copying, by the NVDIMM controller, second data from the second page of the second NVRAM block to the first page of the DRAM block in further response to receiving the page swap command;

receiving, by the NVDIMM controller, a first memory transaction from a memory controller of an information handling system, the first memory transaction targeted to an address within the second NVRAM block; and responding, by the NVDIMM, to the first memory transaction from the first page of the DRAM block.

8. The method of claim 7, further comprising:
sending, by the NVDIMM controller, a reply to the memory controller that the swap page command has been executed in response to copying the first data from the first page of the first NVRAM block to the first page of the DRAM block.

9. The method of claim 7, further comprising:
receiving, by the NVDIMM controller, a second memory transaction from the memory controller, the second memory transaction targeted to a second address within a first page of a second NVRAM block, the first page of the second NVRAM block associated with the first page of the DRAM block;

copying, by the NVDIMM controller, the first data from the first page of the DRAM block to the first page of the first NVRAM block in response to receiving the second memory transaction; and copying, by the NVDIMM controller, second data from the first page of the second NVRAM block to the first page of the DRAM block in further response to receiving the second memory transaction.

10. The method of claim 9, further comprising:
responding, by the NVDIMM, to the second memory transaction from the first page of the DRAM block after the second data from the first page of the second NVRAM block is copied to the first page of the DRAM block.

11. The method of claim 7, wherein the NVDIMM controller copies the first data from the first page of the first NVRAM block to the associated first page of the DRAM block in response to receiving the first memory transaction.

12. The method of claim 7, further comprising:
sending, by the NVDIMM controller, an interrupt to the memory controller that the swap page command has been executed in response to copying the first data from the first page of the first NVRAM block to the first page of the DRAM block.

13. An information handling system, comprising:
a memory controller; and
a non-volatile dual in-line memory module (NVDIMM) including:
a dynamic random access memory (DRAM) block, the DRAM block organized into a number (N) of pages;
a plurality of non-volatile random access memory (NVRAM) blocks, each NVRAM block organized into the number (N) of pages, each page of the DRAM block being N-way set associatively associated with a page of each of the NVRAM blocks; and
an NVDIMM controller configured to copy first data from a first page of a first NVRAM block to an associated first page of the DRAM block;
wherein the memory controller is configured to send a first memory transaction targeted to a first address within the first page of the first NVRAM block to the NVDIMM controller, and the NVDIMM is configured to respond to the first memory transaction from the associated first page of the DRAM block;
wherein the NVDIMM controller is configured, prior to receiving the first memory, transaction, to:
receive a page swap command from the memory controller the page swap command identifying a first page of a second NVRAM block previously copied to the first page of the DRAM block and identifying the first page of the first NVRAM block; and
copy second data from the first page of the DRAM block to the first page of the second NVRAM block in response to receiving the page swap command.

14. The information handling system of claim 13, wherein the NVDIMM controller is further configured to send an interrupt to the memory controller that the swap page command has been executed in response to copying the first data from the first page of the first NVRAM block to the first page of the DRAM block.

15. The information handling system of claim 13, wherein the NVDIMM controller is further configured to send a reply to the memory controller that the swap page command has been executed in response to copying the first data from the first page of the first NVRAM block to the first page of the DRAM block.

* * * * *